(12) United States Patent
Rhome

(10) Patent No.: US 11,766,058 B2
(45) Date of Patent: Sep. 26, 2023

(54) SELF-CONTAINED POPCORN POPPER

(71) Applicant: Gold Medal Products Company, Cincinnati, OH (US)

(72) Inventor: Timothy A. Rhome, Cincinnati, OH (US)

(73) Assignee: Gold Medal Products Company, Cincinnati, OH (US)

( * ) Notice: Subject to any disclaimer, the term of this patent is extended or adjusted under 35 U.S.C. 154(b) by 0 days.

(21) Appl. No.: 17/568,182

(22) Filed: Jan. 4, 2022

(65) Prior Publication Data

US 2022/0125081 A1    Apr. 28, 2022

Related U.S. Application Data

(62) Division of application No. 16/793,204, filed on Feb. 18, 2020, now Pat. No. 11,241,027.

(60) Provisional application No. 62/825,928, filed on Mar. 29, 2019.

(51) Int. Cl.
  *A23L 7/183* (2016.01)
  *B01D 46/10* (2006.01)
  *F24C 15/32* (2006.01)

(52) U.S. Cl.
  CPC ............. *A23L 7/183* (2016.08); *B01D 46/10* (2013.01); *F24C 15/32* (2013.01); *A23V 2002/00* (2013.01)

(58) Field of Classification Search
  CPC ..... A23L 7/174; A23L 7/183; A23V 2002/00; B01D 46/10; F24C 15/32
  USPC ................ 55/385.1; 99/323.7; 426/233, 450
  See application file for complete search history.

(56) References Cited

U.S. PATENT DOCUMENTS

| 5,944,602 | A | * | 8/1999 | Grundy | ................ | F24F 3/167 |
| | | | | | | 312/351 |
| 7,874,244 | B2 | | 1/2011 | Rhome | | |
| 10,299,499 | B2 | | 5/2019 | Rhome | | |
| 11,241,027 | B2 | * | 2/2022 | Rhome | ................ | A23L 7/183 |
| 2004/0245240 | A1 | | 12/2004 | Cretors et al. | | |
| 2009/0133585 | A1 | | 5/2009 | Rhome et al. | | |
| 2013/0276640 | A1 | | 10/2013 | Cretors | | |
| 2013/0280386 | A1 | | 10/2013 | Cretors | | |
| 2015/0099047 | A1 | * | 4/2015 | Rhome | ................ | A23L 7/183 |
| | | | | | | 426/450 |

(Continued)

OTHER PUBLICATIONS

Intellectual Property India, First Examination Report, Application No. 202014012805, dated Jan. 5, 2023 (4 pages).

*Primary Examiner* — Minh Chau T Pham
(74) *Attorney, Agent, or Firm* — Wood Herron & Evans LLP

(57) ABSTRACT

A popcorn popper is provided having a cabinet including a popcorn popping chamber, a kettle positioned within the popcorn popping chamber, at least one inlet provided in the top wall of the popcorn popping chamber configured to receive effluent from the kettle when popping popcorn and a recirculation passage in fluid communication with the at least one inlet that is configured to receive effluent from the at least one inlet. A filter is positioned in the recirculation passage and a blower including a housing in fluid communication with the recirculation passage is provided with an outlet of the housing being configured to direct filtered effluent into the popcorn popping chamber through the top wall and downwardly generally parallel to one of the side walls. A method of operating a popcorn popper is also provided.

2 Claims, 3 Drawing Sheets

(56) References Cited

U.S. PATENT DOCUMENTS

| | | |
|---|---|---|
| 2016/0249657 A1 | 9/2016 | Cherney et al. |
| 2018/0310596 A1 | 11/2018 | Cretors et al. |

\* cited by examiner

SELF-CONTAINED POPCORN POPPER

CROSS-REFERENCE TO RELATED APPLICATION

The present application is a Divisional application of co-pending U.S. Ser. No. 16/793,204, filed Feb. 18, 2020, which claims the benefit of the filing date of U.S. Provisional Application Ser. No. 62/825,928, filed Mar. 29, 2019, the disclosures of which are incorporated herein by reference in their entireties.

FIELD OF THE INVENTION

The present invention relates generally to controlling the emissions of particulates from food preparation processes and, more particularly, to devices, systems, and methods for controlling the emission of particulates from popcorn popping operations.

BACKGROUND OF THE INVENTION

Currently, popcorn poppers, such as the popper disclosed in U.S. Pat. No. 7,874,244 and owned by the common assignee, use a blower and filter combination to capture, from within the popper cabinets, oil, steam, smoke and particulates from the effluent emitted from the popper kettle during the popping process. Within the cabinet, the self-contained system filters the particulates and effluent emitting from the kettle and then exhausts the filtered effluent into the area located outside of the popper cabinet.

The amount of particulates not filtered out of the effluent but permitted by current standards or regulations to exhaust to the surrounding environment outside the popper is typically limited to 5 mg/cubic meter of exhaust discharged from the filter system. Also, no visible particulates should be permitted to escape the cabinet per the relevant emission testing standard for popcorn poppers.

The emission of particulates from a popcorn popping process, via filtered or unfiltered air discharging into the surrounding environment in which a popper operates, is undesirable and can create a number of ultimately significant disadvantages. For example, many movie theaters have adopted digital projection systems or are moving in that direction. Discharged particulates and effluent from the poppers in the theater can deposit or gather on the lens components of the equipment, whether digital or conventional, which may affect or damage the equipment or degrade the projection quality. Some particulates can be troublesome due to being microscopic in size. Particulate deposits of this nature are difficult to clean.

In the popcorn popper described in U.S. Pat. No. 7,874,244, the self-contained popper essentially eliminates the particulate discharge disadvantage by creating defined airflow within the popper cabinet and filtering out particulates from the effluent before that filtered airflow is discharged into the environment surrounding the popper.

Particulate components of such discharges are reduced to such an extent that large capacity poppers with open-sided cabinets can be used to pop popcorn and maintain it at a warm temperature, all without the necessity of connection of the popper to an existing exhaust duct system, or of modifying a building or theater by adding necessary but costly exhaust ductworks. U.S. Pat. No. 7,874,244 is expressly incorporated herein by reference in its entirety.

Notwithstanding the significant advances provided by the self-contained popcorn popper described in U.S. Pat. No. 7,874,244, further popcorn popper technologies and designs for the reduction and elimination of particulate emissions are desired.

In Applicant's prior U.S. application Ser. No. 14/504,854, a self-contained popper is described that is designed to significantly eliminate the emission of effluent from the open popcorn popper, and thus significantly reduce to an immeasurable or significantly low level any particulates from the popcorn popper even where the cabinet housing the cooking kettle and popcorn warming area has one or more fully open sides. The popper described in U.S. application Ser. No. 14/504,854 employs one or more air curtains provide at the open side(s) to contain the effluent within the cabinet. U.S. application Ser. No. 14/504,854 is also expressly incorporated herein by reference in its entirety.

Manufacturers and operators of popcorn poppers continually strive to further reduce or eliminate particulate discharge and to do so efficiently. Therefore, it would be desirable to provide improved devices, systems, and methods for reducing particulate discharge from popcorn poppers.

SUMMARY OF THE INVENTION

The present invention overcomes the foregoing and other shortcomings and drawbacks of self-contained popcorn poppers heretofore known. While the invention will be discussed in connection with certain embodiments, it will be understood that the invention is not limited to these embodiments. On the contrary, the invention includes all alternatives, modifications, and equivalents as may be included within the spirit and scope of the invention.

According to one exemplary embodiment, a popcorn popper is provided comprising a cabinet including a popcorn popping chamber defined at least in part by a pair of side walls, a rear wall extending between the pair of side walls and a top wall, with a kettle being positioned within the popcorn popping chamber.

The popcorn popper also comprises at least one inlet provided in the top wall that is configured to receive effluent from the kettle when popping popcorn.

A recirculation passage is in fluid communication with the at least one inlet and is positioned downstream therefrom such that the recirculation passage is configured to receive effluent from the at least one inlet. A filter is positioned in the recirculation passage and is configured to remove particulates from effluent received by the recirculation passage from the at least one inlet.

The popcorn popper also comprises a blower including a housing in fluid communication with the recirculation passage. The housing has an inlet and an outlet with the inlet being positioned downstream from the filter such that the inlet is configured to receive filtered effluent from the filter. The outlet of the housing is configured to direct filtered effluent into the popcorn popping chamber through the top wall and downward generally parallel to one of the side walls.

In one embodiment, a diffuser is provided including at least one exhaust aperture positioned downstream from the outlet of the housing of the blower. The outlet is configured to direct filtered effluent into the popcorn popping chamber via the at least one exhaust aperture. The outlet may have a first area and the at least one exhaust aperture may have a second area greater than or equal to the first area.

In one embodiment, the at least one exhaust aperture includes a plurality of exhaust apertures, wherein the second area is equal to a cumulative total of areas of the plurality of exhaust apertures.

According to various embodiments, the at least one inlet may be positioned above the kettle. The outlet of the blower housing may be configured to direct filtered effluent into the popcorn popping chamber through the top wall in a vertically downward direction.

In one embodiment, the cabinet of the popcorn popper includes a lower enclosure and an upper enclosure, with the popcorn popping chamber being provided in the lower enclosure, and the recirculation passage being provided in the upper enclosure.

The blower of the popcorn popper according to one embodiment may have a capacity of approximately 500 Cfm.

According to another aspect, a method of operating a popcorn popper is provided. In one embodiment, the method comprises the steps of popping popcorn in a kettle position within a popcorn popping chamber defined at least in part by a pair of side walls, a rear wall extending between the pair of side walls, and a top wall.

The method according to one embodiment also includes the steps of producing effluent resulting from popping the popcorn in the kettle and directing the effluent through a filter. The filtered effluent is discharged through the top wall and downwardly generally parallel to one of the side walls.

According to one embodiment, the method also includes a step of continuously recirculating the filtered effluent within the chamber. The step of recirculating the filtered effluent into the chamber may include directing the filtered effluent vertically downwardly into the chamber.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
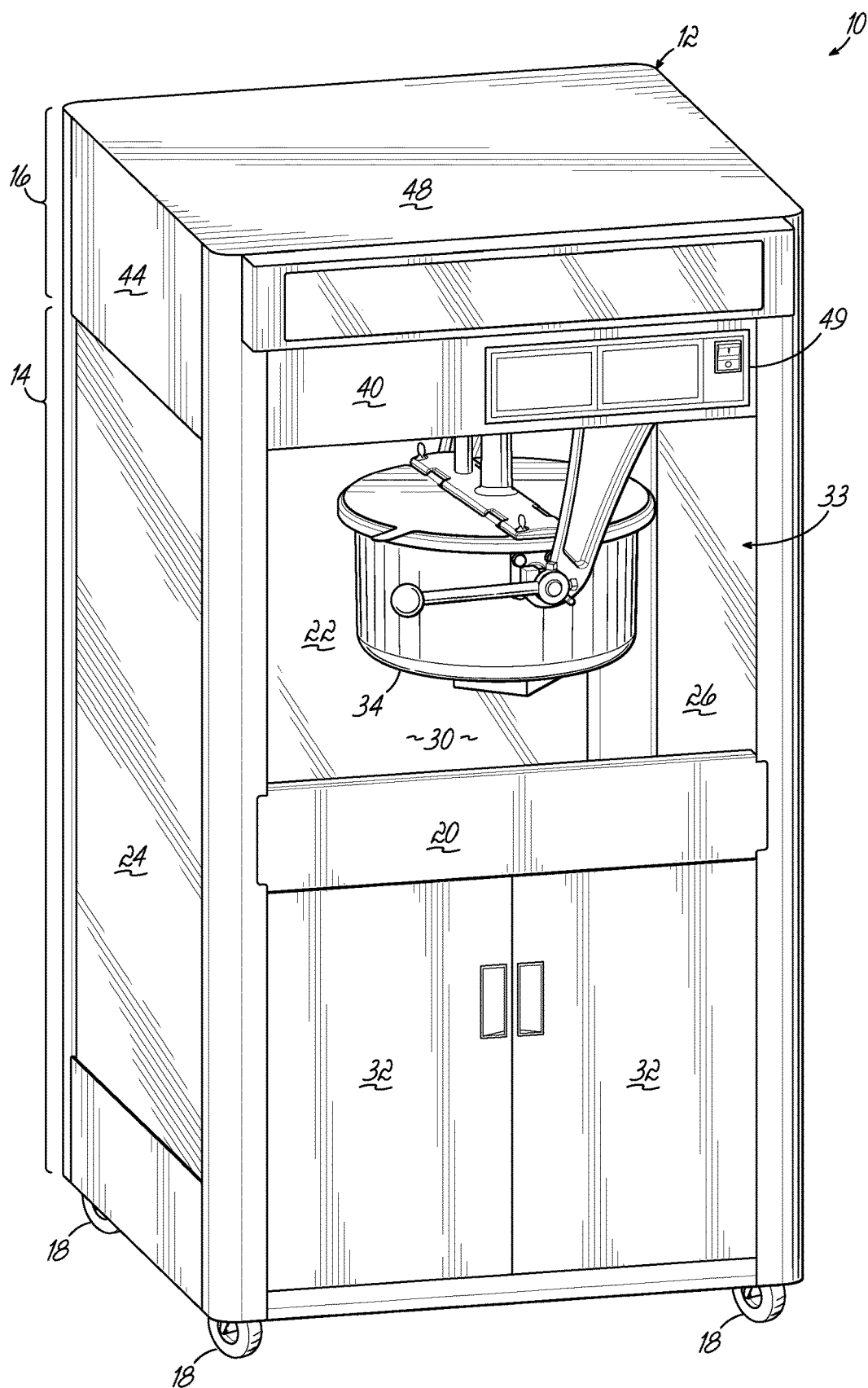
FIG. 1 is a perspective view of an exemplary popcorn popper in accordance with one embodiment of the present invention.
Figure 2:
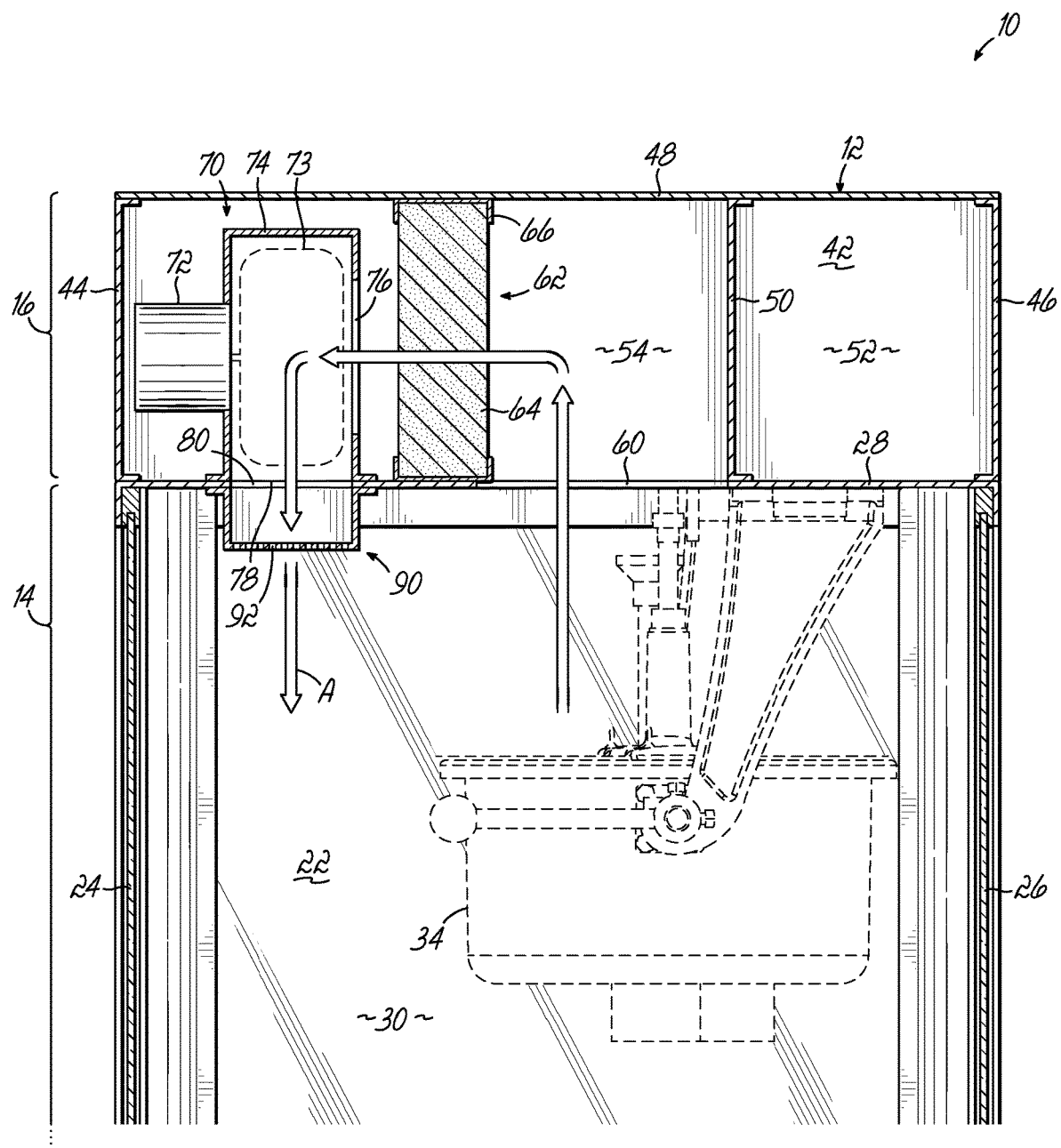
FIG. 2 is a partial cross sectional view of the popcorn popper of FIG. 1, illustrating a flow path of effluent emitted from the kettle of the popcorn popper in the popping chamber and directed through a filter and returned to the popping chamber via a blower, with the kettle and associated components shown in phantom.

With reference to FIGS. 1 and 2, an exemplary popcorn popper 10 according to one embodiment of the present invention is illustrated. The popper 10 includes a popper cabinet 12 having a main lower enclosure 14 and an auxiliary upper enclosure 16, and is supported by a plurality of caster wheels 18. As shown, the main lower enclosure 14 includes a front wall 20, a rear wall 22, first and second side walls 24, 26, a top wall 28 (FIG. 2), and a bottom wall (not shown) collectively defining an interior popcorn popping chamber 30. Hinged doors 32 are provided on the front side of the cabinet 12 for allowing an operator to access supplies, such as corn kernels, popping oil and seasonings, which may be located in the lower enclosure 14 behind the pair of doors 32. A tiltable popcorn popping kettle 34 of any suitable construction is operably disposed within the popcorn popping chamber 30 for popping popcorn and tilting to deposit popped popcorn toward the bottom wall, where the popped popcorn may undergo continued warming and ultimate service therefrom by an operator via an opening 33 provided on the front side of the popping chamber 30. As described in greater detail below, effluent produced as a result of popping popcorn in the kettle 34 is continuously filtered and recirculated into the popcorn popping chamber 30 as indicated by the arrows A in FIG. 2, essentially without escaping from the opening 33 of the popcorn popping chamber 30.

As shown, the auxiliary upper enclosure 16 includes a front panel 40, a rear panel 42, first and second side panels 44, 46, and a top panel 48 positioned above the top wall 28 of the main lower enclosure 14. A suitable control panel 49 for controlling the popcorn popping operation of the popper 10 is provided on the front panel 40. As shown in FIG. 2, a partition panel 50 extends vertically between the top panel 48 of the auxiliary upper enclosure 16 and the top wall 28 of the main lower enclosure 14 to separate the interior space of the auxiliary upper enclosure 16 into a compartment 52 for routing cables or housing other equipment or components of the popper 10, for example, and a recirculation passage 54 for recirculating and filtering effluent emitted from the kettle 34.

To that end, at least one intake opening or inlet 60 is provided in the top wall 28 generally above the kettle 34 such that the inlet 60 is capable of receiving effluent emitted from the kettle 34 during a popping operation, and also from the dumped popped popcorn located in the cabinet 12 while the popper 10 is energized. In the embodiment shown, the inlet 60 is configured as a single enlarged opening in the top wall 28. Alternatively, any suitable number and/or size of openings may be used to define the at least one inlet 60. For example, the inlet 60 may be configured as a slotted and/or perforated vent, or may be equipped with a mesh panel or screen (not shown).

As shown, the recirculation passage 54 is in fluid communication with the inlet 60, and is positioned downstream therefrom relative to the flow path of effluent emitted from the kettle 34 illustrated by the arrows A in FIG. 2. In this manner, the recirculation passage 54 receives effluent via the opening 60 while the popcorn popper is energized.

At least one vertically oriented particulate air filter 62 is positioned in the recirculation passage 54 and extends generally between the top panel 48 of the auxiliary upper enclosure 16 and the top wall 28 of the main lower enclosure 14 such that effluent passing through the recirculation passage 54 from the inlet 60 is directed through the filter 62. While a single filter 62 is shown, any suitable number of filter(s) 62 may be used. The illustrated filter 62 may be approximately 4" wide and includes at least one layer of fibrous or porous material 64 for capturing particulates carried in the effluent, and a peripheral frame 66 for providing strength and rigidity to the filter 62 and for assisting in retaining the filter 62 in place within the recirculation passage 54. In this manner, the filter 62 may remove particulates from the effluent passing through the recirculation passage 54 from the inlet 60. In one embodiment, the filter 62 may be a standard furnace filter typically used in HVAC systems for domestic and/or commercial applications. A removable filter access cover (not shown) may be provided in the auxiliary upper enclosure 16 for allowing an operator to access the filter 62 for maintenance or cleaning purposes, for example, or the operator may simply access the filter 62 via the opening 33 and inlet 60.

As shown diagrammably in FIG. 2, the illustrated popper 10 includes a blower 70 having a motor 72 for driving an impeller 73 rotatably positioned in a housing 74 which is in fluid communication with the recirculation passage 54. In this regard, the housing 74 includes an inlet 76 and an outlet 78, with the inlet 76 being positioned downstream from the filter 62 and the outlet 78 being aligned with at least one similarly sized exhaust opening or outlet 80 provided in the top wall 28. The impeller 73 of the blower 70 is operable to draw effluent emitted from the kettle 34 generally upwardly through the inlet 60, generally horizontally through the recirculation passage 54 and the filter 62, and generally horizontally into the housing 74 through the inlet 76, and to blow the drawn filtered effluent generally downwardly out of the housing 74 through the outlet 78. In this manner, the inlet 76 may receive filtered effluent from the filter 62 in a generally horizontal direction, and the outlet 78 may direct the filtered effluent into the popcorn popping chamber 30 through the outlet 80 provided in the top wall 28 in a generally downward direction. The blower 70 may have any suitable output capacity capable of drawing in effluent from the kettle 34 and blowing the filtered effluent through the outlet 78 into the chamber 30 in a vertically downward direction generally near and parallel to the side wall 24 of the popcorn popping chamber 30. In one embodiment, the blower 70 may be configured to provide a volumetric flow of 500 cubic feet per minute (CFM), although other blower capacities are possible as well.

Thus, the popper 10 may provide a high percentage of particulate capture and may retain effluent flow within the cabinet 12 such that essentially no measurable effluent particulates are projected into the environment located around the cabinet 12. This construction and flow efficiently captures particulate-bearing effluent from the popping operation and filters it with a continuous recirculating flow, without escape outside the cabinet 12. In other words, the popper 10 captures and continuously recirculates effluent from the popcorn popping process, and filters it so few, if any, effluent-bearing process-generating particulates escape from the cabinet 12. Therefore, the popper 10 may be installed and retrofitted into theaters and other facilities without the need for additional hoods, venting ductwork, or associated costs, since essentially no measurable particulate-bearing effluent is released from the cabinet 12 while the popper 10 is energized.

In the embodiment shown, a diffuser 90 including a plurality of exhaust apertures 92 is positioned downstream from the outlet 78 of the housing 74 of the blower 70 and/or from the outlet 80 provided in the top wall 28, such that the outlet 78 is configured to direct filtered effluent into the popcorn popping chamber 30 via the exhaust apertures 92 of the diffuser 90. In one embodiment, the illustrated diffuser 90 is separately formed from the top wall 28 and mechanically coupled thereto. Alternatively, the diffuser 90 may be integrally formed with the top wall 28 as a unitary structure. For example, the exhaust apertures 92 may be provided directly in the top wall 28 in place of the outlet 80. While the illustrated exhaust apertures 92 are provided in a bottom surface of the exemplary diffuser 90 for maintaining the downward direction of the flow path of effluent being discharged from the outlet 78, the exhaust apertures 92 may additionally or alternatively be provided in one or more side surface(s) of the diffuser 90 (e.g., the side surface most proximate to the inlet 60) for at least partially redirecting the flow path of the effluent in a horizontal direction as the filtered effluent is recirculated into the chamber 30.

Figure 3:
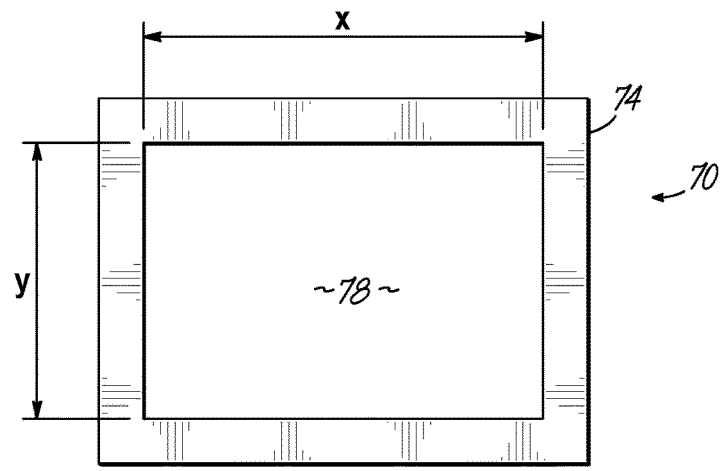
FIG. 3 is a partial bottom plan view of the blower shown in FIG. 2.

Referring now to FIG. 3, the exemplary outlet 78 of the housing 74 of the blower 70 may have a length "x" of about 5" and a width "y" of about 4.2". Thus, the area of the exemplary outlet 78 is "x"×"y". Alternatively, the outlet 78 may have any suitable shape and any corresponding suitable area.

Figure 4:
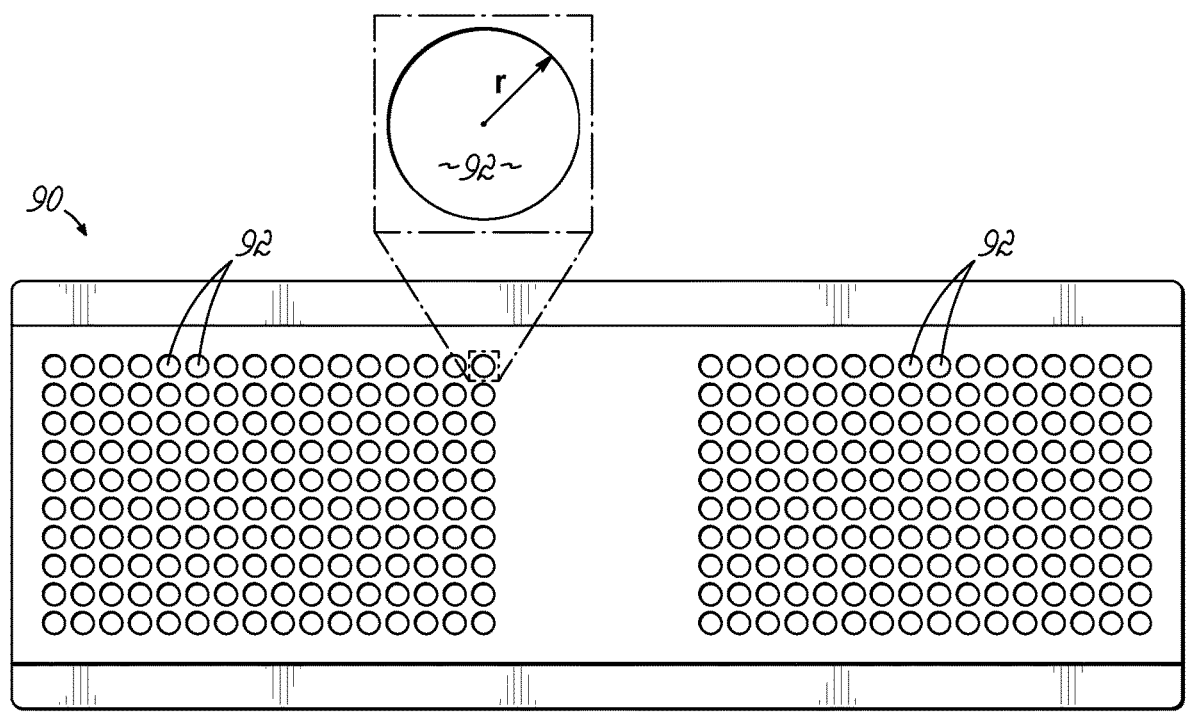
FIG. 4 is a bottom plan view of the diffuser shown in FIG. 2.

Referring now to FIG. 4, the exemplary diffuser 90 includes a total of 320 exhaust apertures 92 arranged in two spaced apart arrays, with each array including 10 rows and 16 columns of exhaust apertures 92. Each exemplary exhaust aperture 92 may be generally circular in shape and have a radius "r". In one embodiment, the radius "r" is 0.156" so that the diameter of each exhaust aperture is 0.312". Thus, the area of each exemplary exhaust aperture 92 is $\pi \cdot r^2$, and the cumulative total of the areas of the exemplary exhaust apertures 92 is $320 \cdot \pi \cdot r^2$. Alternatively, the exhaust apertures 92 may have any suitable shape and any corresponding suitable area, and may be provided in any suitable number and/or arrangement.

In one embodiment, the cumulative total area of the exhaust apertures 92 is greater than or equal to the total area of the outlet 78 of the housing 74 of the blower 70. More particularly, the length "x" and width "y" of the outlet 78 and the radius "r" of each of the exhaust apertures 92 may be selected such that $320 \cdot \pi \cdot r^2$ is greater than or equal to "x"×"y". In this manner, the diffuser 90 including the exhaust apertures 92 generally does not impede the filtered effluent from being discharged from the housing 74 of the blower 70 via the outlet 78. In one embodiment, a pressure sensor (not shown) may be provided in any suitable location along the flow path of the effluent, such as proximate the outlet 78 of the housing 74 of the blower 70, to monitor the effluent fluid pressure at or near the pressure sensor which may be located generally at or downstream of the filter 62. The pressure sensor may be capable of communicating an alert to the operator, such as via a display incorporated into the control panel 49 of the auxiliary upper enclosure 16, in response to detecting that the exhaust fluid pressure has fallen to or near a predetermined limit, thereby indicating that the filter 62 is ready to be replaced.

Referring again primarily to FIG. 2, operating the popcorn popper 10 may include popping popcorn in the kettle 34 within the chamber 30 and producing effluent emitted from the kettle 34 within the chamber 30 resulting from popping the popcorn. The effluent flows along a flow or recirculation path illustrated by the arrows A. As shown, the effluent initially flows generally upwardly into the inlet 60. In this regard, the effluent from the kettle 34 may naturally rise toward the inlet 60, and may further be drawn into the inlet 60 by the blower 70. The effluent may then be drawn by the blower 70 generally horizontally through the recirculation passage 54 where the effluent is directed through the filter 62 for removal of particulates from the effluent. Finally, the filtered effluent may be blown by the blower 70 in a generally downward direction to be discharged into the chamber 30 generally along or parallel to the side wall 24 for recirculation. In the embodiment shown, the filtered effluent is diffused by the diffuser 90 immediately prior to being discharged into the chamber 30.

Measurable particulate-bearing effluent from the popper cabinet 12 is thus substantially eliminated such that there is no need for providing hoods or venting ductwork outside or above the cabinet 12, even in large capacity commercial popping operations.

As used herein, the term "kettle" includes a heatable popcorn popping kettle as in U.S. Pat. No. 7,874,244, or any device for popping popcorn and however constructed for applying heat to unpopped popcorn, including by convection, conduction or otherwise. The kettle 34 may have a capacity of between approximately 32 ounces and approximately 52 ounces, for example. It will be appreciated that while only one kettle 34 is shown, any number of kettle(s) 34 may be positioned within the popcorn popping chamber 30 as may be desired.

As used herein, the term "effluent" includes steam, vapor, oil vapor and particulates emitted from a popcorn popping operation and including air. As described herein, particulates in the effluent from a popcorn popping operation are continuously and progressively filtered from the effluent and any air constituent thereof as the effluent is passed through the filter 62 in a recirculation fluid loop.

It will be appreciated that operation of the popper 10 without actually popping popcorn results in a recirculating air flow from the blower 70 into the chamber 30, through the inlet 60 and into the recirculation passage 54, through the filter 62, and back to the blower 70 substantially without emission of the effluent from the cabinet 12 when the popper 10 is energized. When popcorn is popped in the kettle 34, effluent from the popping operation is entrained in such air flow and is recirculated therewith without substantially escaping from the open cabinet 12.

It will also be appreciated that any air or mixed effluent which might be incidentally emitted or separated from the cabinet 12 or the recirculating flow contains less than the regulatory permitted content of particulates now defined as less than 5 milligrams of particulate per cubic meter of exhaust; while preferably no significant effluent escapes from the cabinet 12. Thus, as used herein, terms like "essentially," "substantial" and "significant" are used to descriptively refer relatively to ranges of effluent or particulates discharge according to the present invention below such amounts as would be regulatorily prohibited.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A method of operating a popcorn popper, the method comprising:
    popping popcorn in a kettle positioned within a popcorn popping chamber defined at least in part by a pair of side walls, a rear wall extending between the pair of side walls, and a top wall;
    producing effluent resulting from popping the popcorn in the kettle;
    directing the effluent through a filter;
    discharging the filtered effluent through the top wall and through a diffuser including at least one exhaust aperture so that the filtered effluent is directed downwardly generally parallel to one of the side walls via the at least one exhaust aperture; and
    continuously recirculating the filtered effluent within the chamber.

2. The method of claim 1, wherein recirculating the filtered effluent into the chamber includes directing the filtered effluent vertically downwardly into the chamber.

* * * * *